(12) United States Patent
Ramalho et al.

(10) Patent No.: US 9,351,024 B2
(45) Date of Patent: *May 24, 2016

(54) MANAGING THE BANDWIDTH OF A COMMUNICATION SESSION

(71) Applicant: Cisco Technology, Inc., San Jose, CA (US)

(72) Inventors: Michael A. Ramalho, Sarasota, FL (US); Toerless T. Eckert, Mountain View, CA (US); Mohamed K. Zanaty, Cary, NC (US); Mihailo Zilovic, Princeton, NJ (US); James E. Coffman, Boulder, CO (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/481,065

(22) Filed: Sep. 9, 2014

(65) Prior Publication Data

US 2014/0376399 A1 Dec. 25, 2014

Related U.S. Application Data

(63) Continuation of application No. 13/305,800, filed on Nov. 29, 2011, now Pat. No. 8,838,828.

(51) Int. Cl.
*H04N 21/2385* (2011.01)
*H04N 21/24* (2011.01)
*H04L 12/26* (2006.01)

(52) U.S. Cl.
CPC ....... *H04N 21/2385* (2013.01); *H04N 21/2402* (2013.01); *H04L 43/0882* (2013.01)

(58) Field of Classification Search
CPC .................... H04L 29/06027; H04L 41/5009; H04L 47/10; G06F 15/16
USPC .......... 709/232, 246; 370/230, 231; 790/232, 790/246

See application file for complete search history.

(56) References Cited

U.S. PATENT DOCUMENTS

| | | | | | |
|---|---|---|---|---|---|
| 5,544,161 | A | * | 8/1996 | Bigham | H04Q 11/0478 348/E5.002 |
| 5,666,487 | A | * | 9/1997 | Goodman | H04L 49/3081 348/E5.002 |
| 7,277,637 | B2 | * | 10/2007 | Jette | H04J 14/02 398/63 |
| 7,808,562 | B2 | * | 10/2010 | Yen | H04N 5/4401 348/570 |
| 7,853,952 | B2 | * | 12/2010 | Riddle | H04L 12/5695 709/226 |
| 7,869,345 | B2 | * | 1/2011 | Scudder | H04L 45/02 370/217 |
| 7,953,017 | B2 | * | 5/2011 | Dolganow | H04L 12/2697 370/249 |

(Continued)

OTHER PUBLICATIONS

Luca De Cicco et al., Skype Video Responsiveness to Bandwidth Variations, Nossdav 2008, Braunschweig, Germany, 6 pages.

(Continued)

*Primary Examiner* — Tesfay Yohannes
(74) *Attorney, Agent, or Firm* — Baker Botts L.L.P.

(57) ABSTRACT

A system includes a processor operable to identify each of a plurality of first video packets from a communication session with a first identifier designating that bandwidth is reserved on the network for the packet, and identify each of a plurality of second video packets from the communication session with a second identifier designating that bandwidth is not reserved on the network for the packet. The system further includes an interface operable to initiate transmission of the plurality of first video packets and the plurality of second video packets in the communication session.

14 Claims, 4 Drawing Sheets

(56) References Cited

U.S. PATENT DOCUMENTS

| | | | | |
|---|---|---|---|---|
| 8,068,419 B2* | 11/2011 | Dujardin | ............ | H04L 63/0272 370/230 |
| 8,094,647 B2* | 1/2012 | Elliott | ................... | H04L 12/14 370/231 |
| 8,191,097 B1* | 5/2012 | Armstrong | ......... | H04N 7/17318 709/213 |
| 8,228,945 B2* | 7/2012 | Matsui | ............... | H04L 12/5695 370/468 |
| 8,422,464 B2* | 4/2013 | Friedman et al. | ............. | 370/333 |
| 8,447,829 B1* | 5/2013 | Geller | .................... | G06F 9/468 709/217 |
| 8,452,276 B2* | 5/2013 | Lauer | ........................... | 455/431 |
| 8,627,396 B2* | 1/2014 | Stanwood | ............... | H04L 65/00 709/224 |

OTHER PUBLICATIONS

Le De Cicco et al., Skype Video Congestion Control: an Experimental Investigation, Computer Networks, pp. 1-16, Oct. 11, 2010.

* cited by examiner

MANAGING THE BANDWIDTH OF A COMMUNICATION SESSION

This application is a continuation of U.S. patent application Ser. No. 13/305,800 filed Nov. 29, 2011 and entitled "Managing the Bandwidth of a Communication Session".

TECHNICAL FIELD

The present disclosure relates generally to communication sessions, and more particularly to managing the bandwidth of communication sessions.

BACKGROUND

Networks often support a number of network components. Network bandwidth is a limited resource, and efficient management of bandwidth allows networks to support more components and/or to provide components with more bandwidth.

BRIEF DESCRIPTION OF THE DRAWINGS

To provide a more complete understanding of the present disclosure and the features and advantages thereof, reference is made to the following description taken in conjunction with the accompanying drawings, in which.

DESCRIPTION OF EXAMPLE EMBODIMENTS

Overview

The teachings of the present disclosure relate to a system comprising a processor operable to identify each of a plurality of first video packets from a communication session with a first identifier designating that bandwidth is reserved on the network for the packet, and to identify each of a plurality of second video packets from the communication session with a second identifier designating that bandwidth is not reserved on the network for the packet. The system further comprises an interface operable to initiate transmission of the plurality of first video packets and the plurality of second video packets in the communication session.

Description

Figure 1:
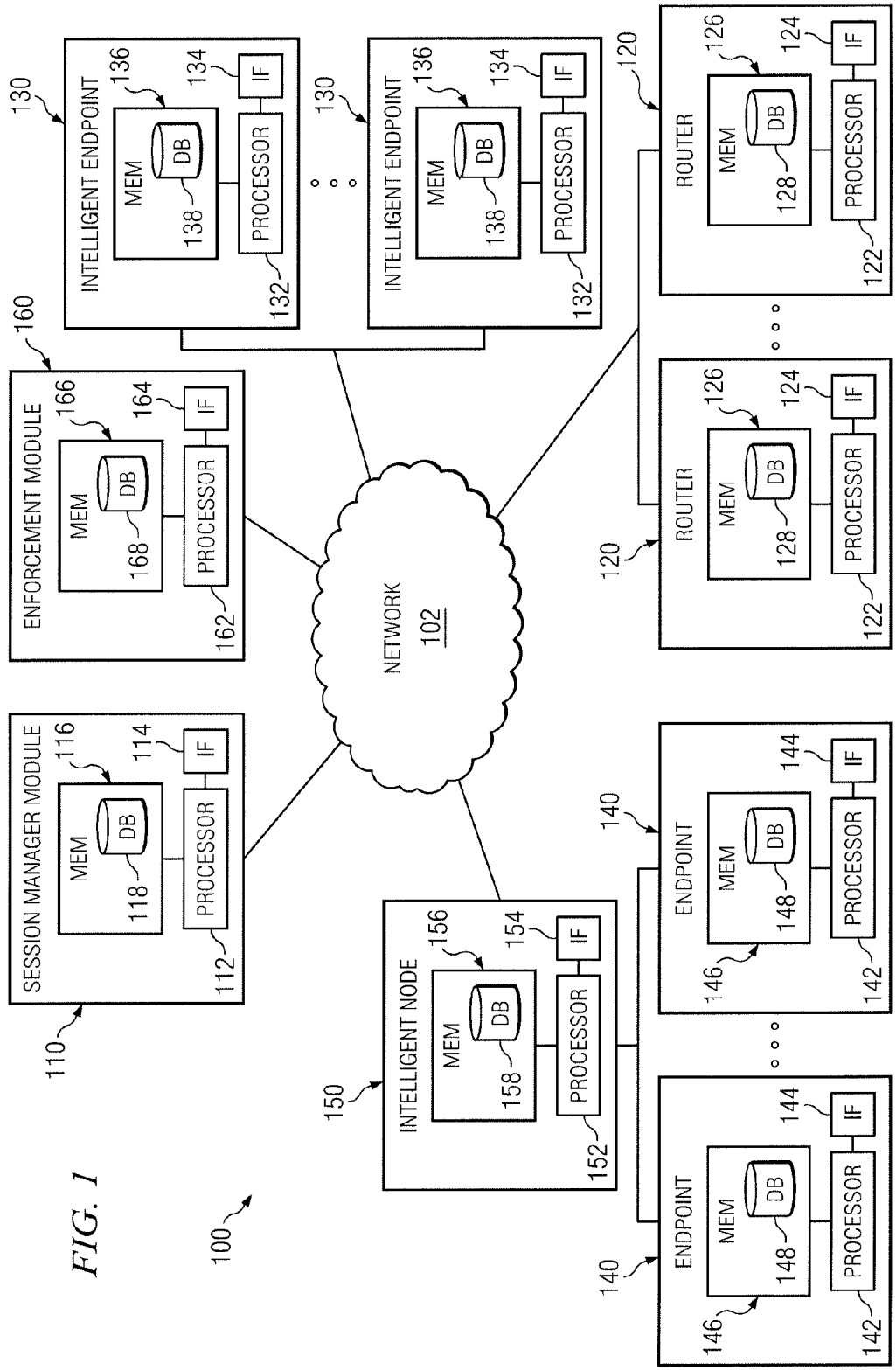
FIG. 1 is a block diagram illustrating an example of a system for managing the bandwidth of a communication session.

FIG. 1 is a block diagram illustrating an example of a system 100 for managing the bandwidth of a communication session. System 100 includes network 102, session manager module 110, one or more routers 120, and one or more intelligent endpoints 130. System 100 may further include one or more of non-intelligent endpoints 140, intelligent nodes 150, and enforcement module 160. Components of system 100 may include one or more of a processor, a memory, a database, an interface, and logic.

A processor represents any computing device, such as processors 112, 122, 132, 142, 152, and 162, configured to control the operation of one or more components of system 100. A processor may comprise one or more processors and may be a programmable logic device, a microcontroller, a microprocessor, any suitable processing device, or any suitable combination of the preceding. A processor includes any hardware and/or software that operates to control and process information received by a component of system 100. In certain embodiments, a processor communicatively couples to other components of system 100, such as an interface (e.g., interfaces 114, 124, 134, 144, 154, and 164), a memory (e.g., memories 116, 126, 136, 146, 156, and 166), or any other suitable component.

A memory represents any device, such as memories 116, 126, 136, 146, 156, and 166, operable to store, either permanently or temporarily, data, operational software, or other information for a processor. Memory includes any one or a combination of volatile or non-volatile local or remote devices suitable for storing information. For example, a memory may include random access memory (RAM), read only memory (ROM), magnetic storage devices, optical storage devices, semiconductor storage devices, or any other suitable information storage device or a combination of these devices. A memory may include any suitable information for use in the operation of component of system 100. A memory may further include some or all of one or more databases, such as databases 118, 128, 138, 148, 158, and 168.

An interface represents any device, such as interfaces 114, 124, 134, 144, 154, and 164, operable to receive input, send output, process the input and/or output, and/or performs other suitable operations for a component of system 100. An interface includes any port or connection, real or virtual, including any suitable hardware and/or software, including protocol conversion and data processing capabilities, to communicate through network 102. In certain embodiments, an interface includes a user interface (e.g., physical input, graphical user interface, touchscreen, buttons, switches, transducer, or any other suitable method to receive input from a user).

Logic may perform the operation of any component of system 100, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer and/or processor. Certain logic, such as a processor, may manage the operation of a component.

Network 102 represents any suitable network operable to facilitate communication between components of system 100, such as session manager module 110, router 120, intelligent endpoint 130, non-intelligent endpoint 140, intelligent node 150, and enforcement module 160. Network 102 may include any interconnecting system capable of transmitting audio, video, electrical signals, optical signals, data, messages, or any combination of the preceding. Network 102 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components of system 100.

Session manager module 110 represents a component operable to manage the use of bandwidth by components on network 102. In certain embodiments, session manager module 110 communicates an allocated bandwidth amount to one or more components, such as intelligent endpoint 130 and/or intelligent node 150, representing an amount of bandwidth reserved on network 102 for each of the components. Session manager module 110 may allocate bandwidth for one or more communication sessions of a component. In certain embodiments, session manager module 110 communicates an allocated bandwidth amount for each communication session from a component.

The allocated bandwidth amount provides a component with a minimum amount of bandwidth for one or more communication sessions. In certain embodiments, session manager module 110 may exchange information with a component to determine the amount of bandwidth to allocate to the component. For example, a component may request an amount of bandwidth, and session manager module 110 may allocate that amount of bandwidth to the component, or may counter with a different amount of bandwidth.

Session manager module 110 may communicate a maximum bandwidth amount to a component. A maximum bandwidth amount represents the maximum amount of bandwidth on network 102 that may be used by a component for one or more communication sessions. That is, where an allocated bandwidth amount represents a bandwidth floor, below which a component will not have to drop, the maximum bandwidth amount represents a bandwidth ceiling, above which a component may not rise.

A maximum bandwidth amount may be based on characteristics of components involved in the communication session. For example, a video communication session communicated to a component with a three inch diagonal display may have a maximum bandwidth amount lower than a video communication session communicated to a component with a 50 inch diagonal display. A maximum bandwidth amount may be based on characteristics of the communication session. For example a video communication session where changes between video frames are small (e.g., a person sitting in front of a static background) may have a maximum bandwidth amount lower than a video communication session where changes between video frames are large (e.g., a sporting event). In certain embodiments, session manager module 110 includes processor 112, interface 114, memory 116, and database 118. Session manager module 110 may be part of a component, such as intelligent endpoint 130 or intelligent node 150.

Router 120 represents a component operable to route data packets to their destination on network 102. In certain embodiments, data packets may contain identifiers. Identifiers may be any suitable indicia readable by network components that identify sets of data packets. Identifiers may be located in any suitable portion of a data packet, for example, the differentiated services code point (DSCP) field of the data packet header, a real-time transport protocol (RTP) header extension, the payload (e.g., a network abstraction layer (NAL) unit), or the transport format. In an embodiment, a first identifier may identify data packets that have space reserved on network 102, and a second identifier may identify packets that do not have space reserved on network 102. Data packets identified by a first identifier may be referred to as admitted data packets. Data packets identified by a second identifier may be referred to as unadmitted data packets.

Router 120 may read data packets for identifiers. In an embodiment, router 120 will provide admitted packets with bandwidth regardless of the amount of bandwidth available on network 102. For example, if there is insufficient bandwidth on network 102, router 120 may drop unadmitted packets to free bandwidth for admitted packets. Router 120 may only route unadmitted data packets if there is sufficient bandwidth on network 102 for the admitted data packets. In certain embodiments, router 120 includes processor 122, interface 124, memory 126, and database 128.

Intelligent endpoint 130 represents a component operable to identify data packets with one or more identifiers. For example, intelligent endpoint 130 may prioritize data packets in a communication session. Intelligent endpoint 130 may identify data packets that have a high priority as admitted to ensure that they have reserved bandwidth. Data packets that have a lower priority may be identified as unadmitted to take advantage of available bandwidth on network 102. Intelligent endpoint 130 may utilize any number of identifiers to identify any useful set of data packets.

In certain embodiments intelligent endpoint 130 is operable to monitor available bandwidth on network 102. For example, intelligent endpoint 130 may determine a specific amount of bandwidth available on network 102, or may determine whether or not there is any available bandwidth on network 102. In an embodiment, intelligent endpoint 130 senses available bandwidth on network 102 by monitoring data packets from the communication session that are dropped by network 102. If data packets are dropped, intelligent endpoint 130 may determine that there is no available bandwidth on network 102. If no data packets are dropped, intelligent endpoint 130 may determine that there is available bandwidth on network 102. By monitoring available bandwidth on network 102, intelligent endpoints 130 (and/or intelligent nodes 150) can increase the amount of bandwidth used by a communication session when bandwidth is available, and decrease the amount of bandwidth used by a communication session when bandwidth is not available.

In an example embodiment of operation, intelligent endpoint 130 receives an allocated bandwidth amount representing an amount of bandwidth reserved on network 102. An allocated bandwidth amount may apply to one or more communication sessions communicated from intelligent endpoint 130 (e.g., for all communication sessions, a particular communication session, or a particular set of communication sessions). The allocated bandwidth amount provides intelligent endpoint 130 with a minimum amount of bandwidth to utilize. Intelligent endpoint 130 may receive an allocated bandwidth amount from session manager module 110 or other component operable to allocate network bandwidth.

In an embodiment, intelligent endpoint 130 identifies a plurality of first data packets from a communication session with a first identifier that designates that bandwidth is reserved on network 102 for the first data packets (e.g., admitted data packets). The bandwidth of admitted data packets may be determined based on the allocated bandwidth amount, for example, the bandwidth of admitted data packets may be the allocated bandwidth amount. In particular embodiments, the bandwidth of admitted data packets may not exceed the allocated bandwidth amount.

In an embodiment, intelligent endpoint 130 monitors network 102 to determine whether there is available bandwidth on network 102. Available bandwidth represents unused bandwidth on network. Available bandwidth may be unallocated bandwidth, or may be allocated bandwidth that is not being used. For example, session manager module 110 may allocate all the bandwidth of network 102 to components, however, not all components with allocated bandwidth may be communicating at the same time. Even though all the bandwidth on network 102 is allocated, some bandwidth may be available if all the allocated bandwidth is not being used. In another example, session manager module 110 may not allocate all the bandwidth of network 102 and some bandwidth would be available even if all components are fully utilizing their respective allocated bandwidth amounts. In certain embodiments, intelligent endpoint 130 determines an amount of bandwidth available on network 102.

In certain embodiments, intelligent endpoint 130 identifies a plurality of second data packets from the communication session with a second identifier that designates that bandwidth is not reserved on network 102 (e.g., unadmitted data packets). If there is no bandwidth available on network 102, unadmitted data packets may be dropped to provide bandwidth for admitted data packets. However, if there is available bandwidth on network 102, unadmitted data packets may utilize the available bandwidth. The bandwidth of unadmitted data packets in a communication session may be determined based on the available bandwidth on network 102 (e.g., bandwidth available in excess of an allocated bandwidth amount for intelligent endpoint 130).

Intelligent endpoint 130 may adjust the bandwidth of data packets during a communication session. For example, intelligent endpoint 130 may adjust the communication rate and/or the size (e.g., data size) of data packets in any suitable manner. In certain embodiments, intelligent endpoint 130 adjusts the bandwidth of video data packets by adjusting the video frame rate, quantization (sometimes referred to as bit depth or quality), video resolution, and/or any other suitable characteristic of the data packets. In certain embodiments, intelligent endpoint 130 only adjusts the bandwidth of unadmitted data packets, and does not adjust the bandwidth of admitted data packets.

Intelligent endpoint 130 may adjust the bandwidth of data packets during a communication session based on the monitored available bandwidth on network 102 (e.g., available bandwidth in excess of the allocated bandwidth amount). For example, if intelligent endpoint 130 determines that there is available bandwidth on network 102, then intelligent endpoint 130 may increase the bandwidth of data packets to utilize the available bandwidth. If intelligent endpoint 130 determines that there is not available bandwidth on network 102, intelligent endpoint 130 may reduce the bandwidth of data packets to avoid data packets being lost due to insufficient bandwidth.

Intelligent endpoint 130 may include a server, router, set-top unit (STU), computer, mobile phone, tablet, smart phone, telephone, television, or any other suitable device that may identify packets with identifiers. In certain embodiments, intelligent endpoint 130 includes processor 132, interface 134, memory 136, and database 138.

In certain embodiments, system 100 further includes non-intelligent endpoints 140. Non-intelligent endpoints 140 represent endpoints that are not operable to identify data packets with one or more identifiers, and/or adjust the bandwidth of data packets. For example, one or more non-intelligent endpoints 140 (e.g., legacy endpoints) that do not have the capabilities of intelligent endpoints 130 may be connected to network 102. Non-intelligent endpoints 140 may include a server, router, set-top unit (STU), computer, mobile phone, tablet, smart phone, telephone, television, or any other suitable device that may identify packets with identifiers. In certain embodiments, non-intelligent endpoint 140 includes processor 142, interface 144, memory 146, and database 148.

System 100 may further include one or more intelligent nodes 150 operable receive communication sessions from non-intelligent endpoints 140, identify data packets from the communication sessions as admitted or unadmitted, receive allocated bandwidth amounts for non-intelligent endpoints 140, receive maximum bandwidth amounts for non-intelligent endpoints 140, adjust the bandwidth of unadmitted data packets from communication sessions from non-intelligent endpoints 140, and/or provide any other functionality of intelligent endpoint 130 for unintelligent endpoints 140. In certain embodiments, intelligent node 150 includes processor 152, interface 154, memory 156, and database 158.

System 100 may include enforcement module 160. Enforcement module 160 represents a component operable to enforce network policy. For example, enforcement module 160 may receive an allocated bandwidth amount and a maximum bandwidth amount for a communication session from a component, and may monitor the bandwidth of the communication session and of admitted packets in the communication session. If the bandwidth of the communication session exceeds the maximum bandwidth amount or if the bandwidth of admitted packets in the communication session exceeds the allocated bandwidth amount, enforcement module 160 may take action to prevent the component from utilizing more bandwidth than network policy allows. For example, enforcement module 160 may cause admitted packets exceeding the allocated bandwidth amount to be dropped, or may cause unadmitted packets exceeding the maximum bandwidth amount to be dropped. Enforcement module may prevent a component from utilizing any bandwidth on network until the component adheres to network policy. Enforcement module may communicate instructions to a component to reduce the bandwidth of admitted data packets in a communication session and/or the combined bandwidth of all the data packets in a communication session, or any other suitable action to prevent a component from violating network policy.

Modifications, additions, or omissions may be made to system 100. System 100 may include more, fewer, or other components. Any suitable component of system 100 may include a processor, interface, logic, memory, and/or other suitable element. While certain examples may include video data packets, data packets may communicate any suitable data. The bandwidth of data packets may be adjusted in any suitable fashion.

Figure 2:
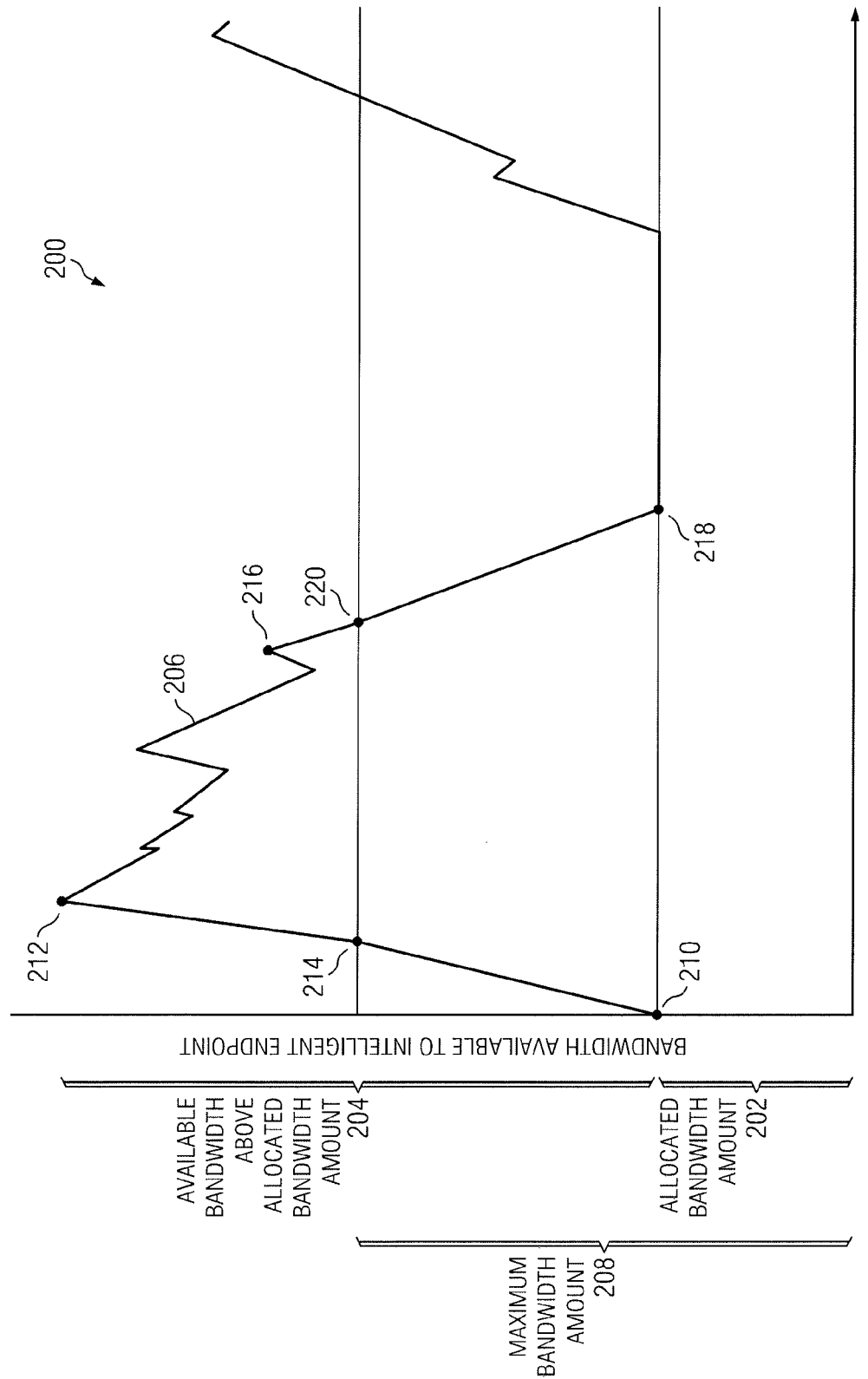
FIG. 2 is a diagram illustrating details of managing the bandwidth of a communication session with the system of FIG. 1.

FIG. 2 is a graph 200 illustrating details of managing the bandwidth of a communication session on network 102 with the system of FIG. 1. Graph 200 illustrates an example of bandwidth management on network 102. Allocated bandwidth amount 202 represents the amount of bandwidth on network 102 allocated to intelligent endpoint 130. Allocated bandwidth amount 202 represents a bandwidth floor, below which intelligent endpoint 130 does not have to go. Available bandwidth 206 represents the bandwidth available to intelligent endpoint 130 on network 102. Available bandwidth 206 never decreases below allocated bandwidth amount 202 because intelligent endpoint 130 always has access to at least allocated bandwidth amount 202. Area 204 on diagram 200 depicts the available bandwidth to intelligent endpoint 130 in excess of allocated bandwidth amount 202.

Maximum bandwidth amount 208 represents the maximum amount of bandwidth on network 102 that intelligent endpoint 130 may use for a communication session. Even if available bandwidth 206 on network 102 exceeds the maximum bandwidth amount 208, intelligent endpoint 130 is capped at the maximum bandwidth amount 208.

Available bandwidth 206 on network 102 increases from point 210 to point 212. Intelligent endpoint 130 can increase the bandwidth of a communication session as available bandwidth 206 increases. If intelligent endpoint 130 exceeds allocated bandwidth amount 202 to utilize available bandwidth 206, intelligent endpoint 130 may designate data packets exceeding the allocated bandwidth amount as unadmitted. In certain embodiments, intelligent endpoint 130 adjusts the bandwidth of unadmitted data packets by adjusting the communication rate and/or packet size, for example, by adjusting one or more of the frame rate, quantization, and/or video resolution. However, if intelligent endpoint 130 uses more bandwidth than is available, routers 120 may drop unadmitted data packets to ensure bandwidth for admitted data packets. By only dropping unadmitted data packets, system 100 can ensure that each intelligent endpoint 130 is able to utilize its respective allocated bandwidth amount 202. Additionally, by allowing unadmitted data packets if there is available bandwidth 206, system 100 prevents available bandwidth 206 on network 102 from being wasted.

At point 214, available bandwidth 206 reaches maximum bandwidth amount 208. Intelligent endpoint 130 may increase the bandwidth of a communication session to maximum bandwidth amount 208, but may not exceed it. Available bandwidth 206 on network 102 decreases from point 216 to point 218. At point 220, available bandwidth 206 decreases below maximum bandwidth amount 208. Intelligent endpoint 130 may decrease the bandwidth of the communication session such that it does not exceed available bandwidth 206. At point 218, there is no available bandwidth 206. However, intelligent endpoint 130 may continue to utilize allocated bandwidth amount 202 with admitted data packets for a communication session. In an embodiment, the bandwidth of allocated data packets is less than or equal to the allocated bandwidth amount 202.

Figure 3:
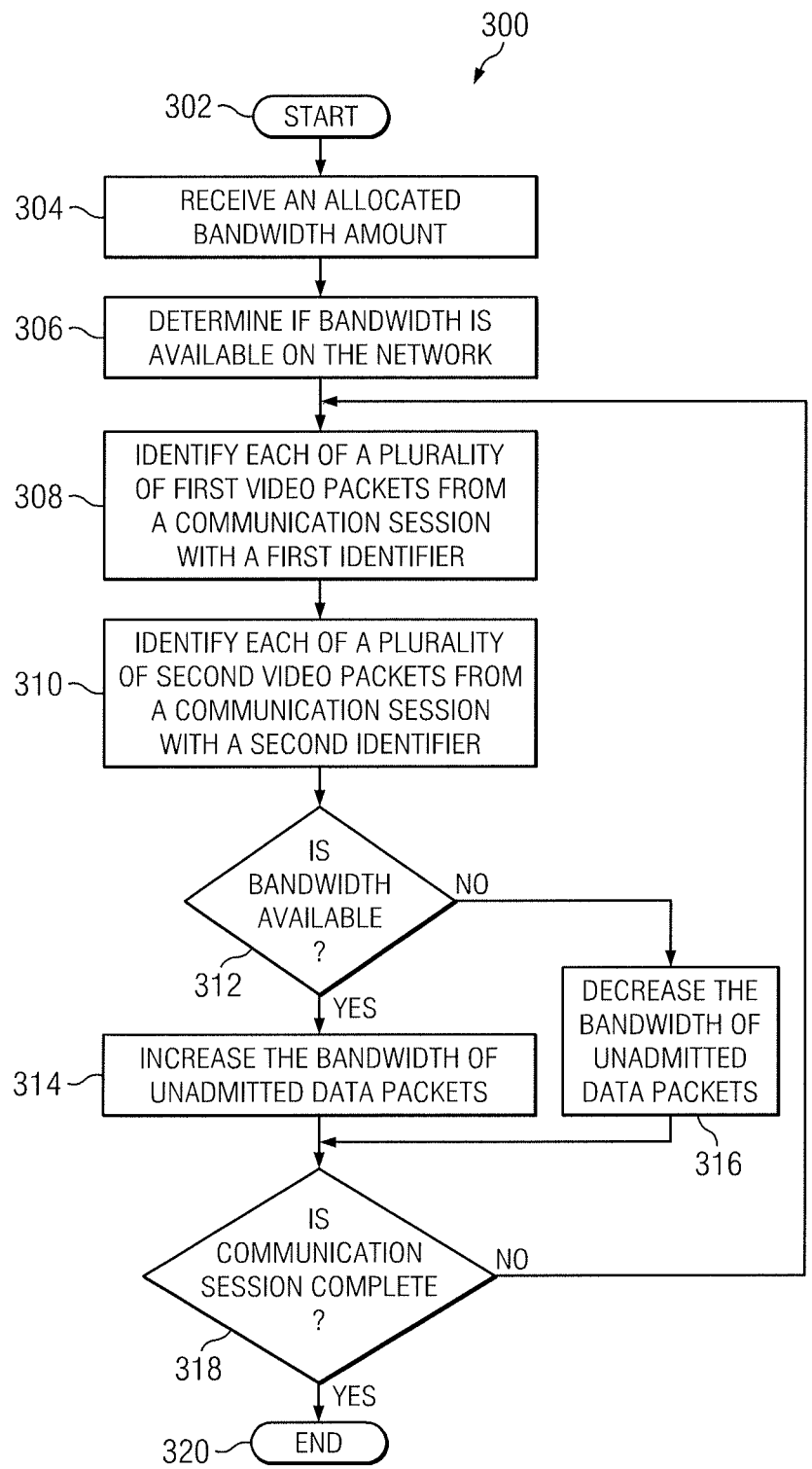
FIG. 3 is a flowchart illustrating example steps associated with the system of FIG. 1.

FIG. 3 is a flowchart illustrating an example method 300 associated with the system of FIG. 1. The method 300 begins at step 302. At step 304, intelligent endpoint 130 receives an allocated bandwidth amount from session manager 110 for a communication session. At step 306, intelligent endpoint 130 determines if there is available bandwidth on network 102.

At step 308, intelligent endpoint 130 identifies each of a plurality of first video packets from the communication session with a first identifier designating that bandwidth is reserved on network 102 for the first video packets (e.g., admitted data packets). In an embodiment, the bandwidth of admitted data packets is based on the allocated bandwidth amount. At step 310 intelligent endpoint 130 identifies each of a plurality of second video packets from the communication session with a second identifier designating that bandwidth is not reserved on network 102 for the second video packets (e.g., unadmitted data packets). In an embodiment, the bandwidth of unadmitted data packets is based on the available bandwidth on network 102 (e.g., bandwidth available in excess of the allocated bandwidth amount).

At step 312, intelligent endpoint 130 monitors the available bandwidth on network 102. If there is available bandwidth, the method moves to step 314 and intelligent endpoint 130 increases the bandwidth of unadmitted data packets. If there is not available bandwidth, the method moves to step 316 and intelligent endpoint 130 decreases the bandwidth of unadmitted data packets. In an embodiment, intelligent endpoint 130 adjusts the bandwidth of unadmitted data packets by adjusting one or more of frame rate, quantization, and video resolution.

At step 318, intelligent endpoint 130 determines whether the communication session has ended. If the communication session has not ended, the method moves to step 308 and intelligent endpoint 130 continues to monitor available bandwidth on network 102. If the communication session has ended, then the method ends at step 320.

Modifications, additions, or omissions may be made to method 300. Method 300 may include more, fewer, or other steps. The steps of method 300 may be performed in any suitable order, and may be performed by any suitable component of system 100.

Figure 4:
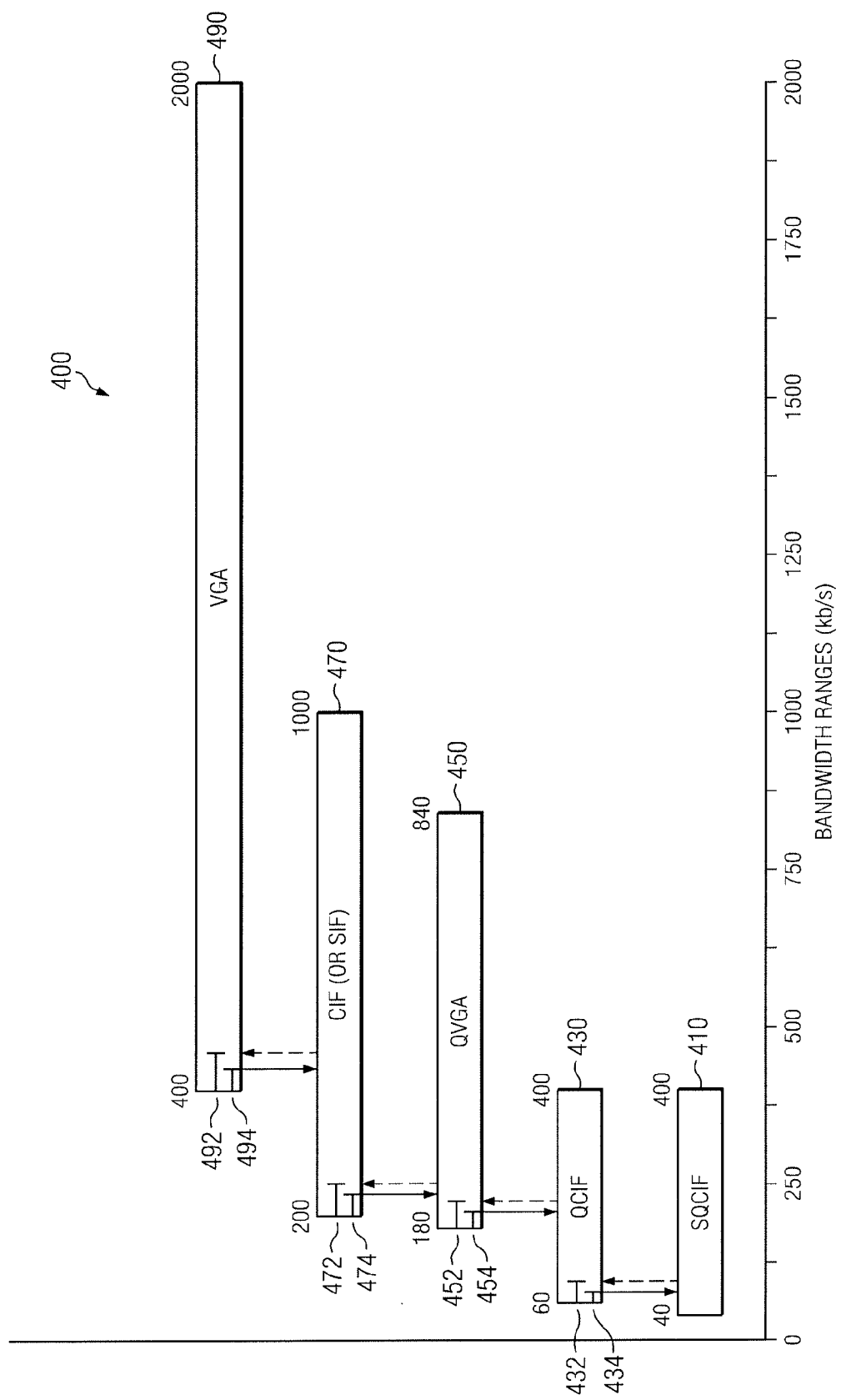
FIG. 4 is a diagram illustrating details associated with an embodiment the system of FIG. 1.

FIG. 4 is a diagram illustrating an example of adjusting the bandwidth of data packets during a communication session associated with an embodiment the system of FIG. 1. In the illustrated embodiment, the data packets are video data packets, and the bandwidth of the communication session is adjusted by adjusting one or more of the video frame rate, quantization, and video resolution.

The horizontal axis of diagram 400 represents bandwidth in kilobits per second (kb/s). Boxes 410, 430, 450, 470, and 490 depict a number of video resolutions. The left edge of each box depicts the typical bandwidth of that resolution at the lowest frame rate and quantization levels. The right edge of each box depicts the typical bandwidth of that resolution at the highest frame rate and quantization levels.

Box 410 represents sub quarter common intermediate format (SQCIF) resolution. The bandwidth of SQCIF typically ranges from about 40 kb/s at the lowest frame rate and quantization levels to about 400 kb/s at the highest quantization and frame rate levels. Box 430 represents quarter common intermediate format (QCIF) resolution. The bandwidth of QCIF typically ranges from about 60 kb/s at the lowest frame rate and quantization levels to about 400 kb/s at the highest quantization and frame rate levels. Box 450 represents quarter video graphics array (QVGA) resolution. The bandwidth of QVGA typically ranges from about 180 kb/s at the lowest frame rate and quantization levels to about 840 kb/s at the highest quantization and frame rate levels. Box 470 represents common intermediate format (CIF) resolution. The bandwidth of CIF typically ranges from about 200 kb/s at the lowest frame rate and quantization levels to about 1000 kb/s at the highest quantization and frame rate levels. Box 490 represents video graphics array (VGA) resolution. The bandwidth of VGA typically ranges from about 400 kb/s at the lowest frame rate and quantization levels to about 2000 kb/s at the highest quantization and frame rate levels.

In an embodiment, intelligent endpoint 130 has an allocated bandwidth amount of 50 kb/s for a communication session. Therefore, intelligent endpoint 130 can maintain at least SQCIF for the communication session even if all available bandwidth on network 102 is used. In an embodiment, the bandwidth available to intelligent endpoint 130 on network 102 rises to 170 kb/s (50 kb/s allocated+120 kb/s of available bandwidth in excess of allocated). Intelligent endpoint 130 may detect the rise in available bandwidth and increase the frame rate and quantization at SQCIF to take advantage of the available bandwidth.

As the bandwidth available to intelligent endpoint 130 increases, intelligent endpoint 130 may increase resolution. Changing resolution requires communicating a new reference frame for the new resolution, which may comprise a large amount of data. To avoid rapidly switching between resolutions (referred to as fluttering), and having to repeatedly communicate new reference frames, intelligent endpoint 130 may require that total bandwidth available to intelligent endpoint 130 be an promotion buffer amount 432, 452, 472, and 492 greater than the minimum bandwidth for the next highest resolution. If the available bandwidth decreases after intelligent endpoint 130 promotes resolutions, intelligent endpoint 130 has buffer of bandwidth.

In an embodiment, intelligent endpoint 130 may demote to a lower resolution when the total bandwidth amount available is demotion buffer amount 434, 454, 474, and 494 greater than the lowest bandwidth for the current resolution. The demotion buffer amounts 434, 454, 474, and 494 can prevent interruptions to the communication session if total available bandwidth drops below the minimum bandwidth threshold for the resolution before intelligent endpoint 130 demotes to a new lower resolution.

Intelligent endpoint 130 may require that the total bandwidth available to intelligent endpoint 130 be stable for a particular time period before promoting to the next highest resolution, or demoting to the next lowest resolution. Intelligent endpoint 130 can set one or more of time periods to reduce the risk that intelligent endpoint 130 will have to rapidly change between two resolutions.

Modifications, additions, or omissions may be made to diagram 400. While the illustrated embodiment was directed towards video data packets, any data packet may be used. Any suitable characteristic of a communication session may be adjusted to adjust the bandwidth of the communication session.

Certain embodiments of the present disclosure may provide one or more technical advantages. In an embodiment, system 100 is able to provide components (e.g., intelligent endpoints 130 and/or intelligent nodes 150) with a minimum bandwidth for a communication session, while still allowing the component to utilize available bandwidth on network 102. In particular embodiments, system 100 allows components to adjust the bandwidth of a communication session while the communication session is in progress. In certain embodiments, system 100 allows components to utilize reserved bandwidth with admitted data packets, to utilize unreserved, but available, bandwidth with unadmitted data packets, and to adjust the bandwidth of the unadmitted data packets by adjusting the communication rate and or packet size of the unadmitted data packets.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A system comprising:
a processor operable to:
designate a plurality of first video packets from a communication session with a first identifier designating that bandwidth is reserved on a network for the first video packets; and
designate a plurality of second video packets from the communication session with a second identifier designating that bandwidth is not reserved on the network for the second video packets;
monitor an available bandwidth on the network; and
adjust, during the communication session, based on the monitored available bandwidth, a bandwidth of at least one from a set comprising:
the plurality of first video packets; and
the plurality of second video packets, the bandwidth of the plurality of second video packets adjusted by adjusting at least one from a set comprising: video frame rate, quantization, and video resolution; and
an interface operable to initiate transmission of the plurality of first video packets and the plurality of second video packets in the communication session.

2. The system of claim 1, the interface further operable to receive an allocated bandwidth amount, the allocated bandwidth amount representing an amount of bandwidth reserved on the network for the plurality of first video packets.

3. The system of claim 1:
the interface further operable to receive a maximum bandwidth amount, the maximum bandwidth amount representing a maximum amount of bandwidth on the network allowed for communication session; and
the processor further operable to adjust the bandwidth of the plurality of second video packets based on the received maximum bandwidth amount such that the bandwidth of the communication session does not exceed the maximum bandwidth amount.

4. The system of claim 1, further comprising a packet identifier located in at least one from a set comprising:
a differentiated services code point (DSCP) field of the header of a data packet;
a real-time transport protocol header extension of a data packet;
a payload of a data packet; and
a transport format of a data packet.

5. The system of claim 1, each of the plurality of first video packets identified with the first identifier designating that bandwidth is reserved on a network for the first video packets; and
each of the plurality of second video packets identified with the second identifier designating that bandwidth is reserved on a network for the second video packets.

6. A non-transitory computer readable medium comprising logic, the logic, when executed by a processor, operable to:
designate a plurality of first video packets from a communication session with a first identifier designating that bandwidth is reserved on a network for the first video packets;
designate a plurality of second video packets from the communication session with a second identifier designating that bandwidth is not reserved on the network for the second video packets;
monitor an available bandwidth on the network; and
adjust, during the communication session, based on the monitored available bandwidth, a bandwidth of at least one from a set comprising:
the plurality of first video packets; and
the plurality of second video packets, the bandwidth of the plurality of second video packets adjusted by adjusting at least one from a set comprising: video frame rate, quantization, and video resolution; and
initiate transmission of the plurality of first video packets and the plurality of second video packets in the communication session.

7. The computer readable medium of claim 6, the logic further operable to receive an allocated bandwidth amount, the allocated bandwidth amount representing an amount of bandwidth reserved on the network for the plurality of first video packets.

8. The computer readable medium of claim 6, the logic further operable to:
receive a maximum bandwidth amount, the maximum bandwidth amount representing a maximum amount of bandwidth on the network allowed for communication session; and
adjust the bandwidth of the plurality of second video packets based on the received maximum bandwidth amount such that the bandwidth of the communication session does not exceed the maximum bandwidth amount.

9. The computer readable medium of claim 6, further comprising a packet identifier located in at least one from a set comprising:
a differentiated services code point (DSCP) field of the header of a data packet;
a real-time transport protocol header extension of a data packet;
a payload of a data packet; and
a transport format of a data packet.

10. The computer readable medium of claim 6, each of the plurality of first video packets identified with the first identifier designating that bandwidth is reserved on a network for the first video packets; and each of the plurality of second video packets identified with the second identifier designating that bandwidth is reserved on a network for the second video packets.

11. A method, comprising:

designating, by a processor, a plurality of first video packets from a communication session with a first identifier, the first identifier designating that bandwidth is reserved on a network for the first video packets;

designating, by a processor, a plurality of second video packets from the communication session with a second identifier, the second identifier designating that bandwidth is not reserved on the network for the second video packets;

monitoring, by a processor, an available bandwidth on the network; and adjusting, by a processor, during the communication session, based on the monitored available bandwidth, a bandwidth of at least one from a set comprising:

the plurality of first video packets; and the plurality of second video packets, the bandwidth of the plurality of second video packets adjusted by adjusting at least one from a set comprising: video frame rate, quantization, and video resolution; and initiating transmission of the plurality of first video packets and the plurality of second video packets in the communication session.

12. The method of claim 11, further comprising receiving an allocated bandwidth amount, the allocated bandwidth amount representing an amount of bandwidth reserved on the network for the plurality of first video packets.

13. The method of claim 11, further comprising:

receiving a maximum bandwidth amount, the maximum bandwidth amount representing a maximum amount of bandwidth on the network allowed for communication session; and adjusting the bandwidth of the plurality of second video packets based on the received maximum bandwidth amount such that the bandwidth of the communication session does not exceed the maximum bandwidth amount.

14. The method of claim 11, each of the plurality of first video packets identified with the first identifier designating that bandwidth is reserved on a network for the first video packets; and each of the plurality of second video packets identified with the second identifier designating that bandwidth is reserved on a network for the second video packets.

* * * * *